April 21, 1942.  J. F. GUGGOLZ  2,280,577
OIL FILTER
Filed April 4, 1941  2 Sheets-Sheet 1

J. F. Guggolz
INVENTOR.
BY

April 21, 1942.                J. F. GUGGOLZ                2,280,577
                                OIL FILTER
                           Filed April 4, 1941              2 Sheets-Sheet 2
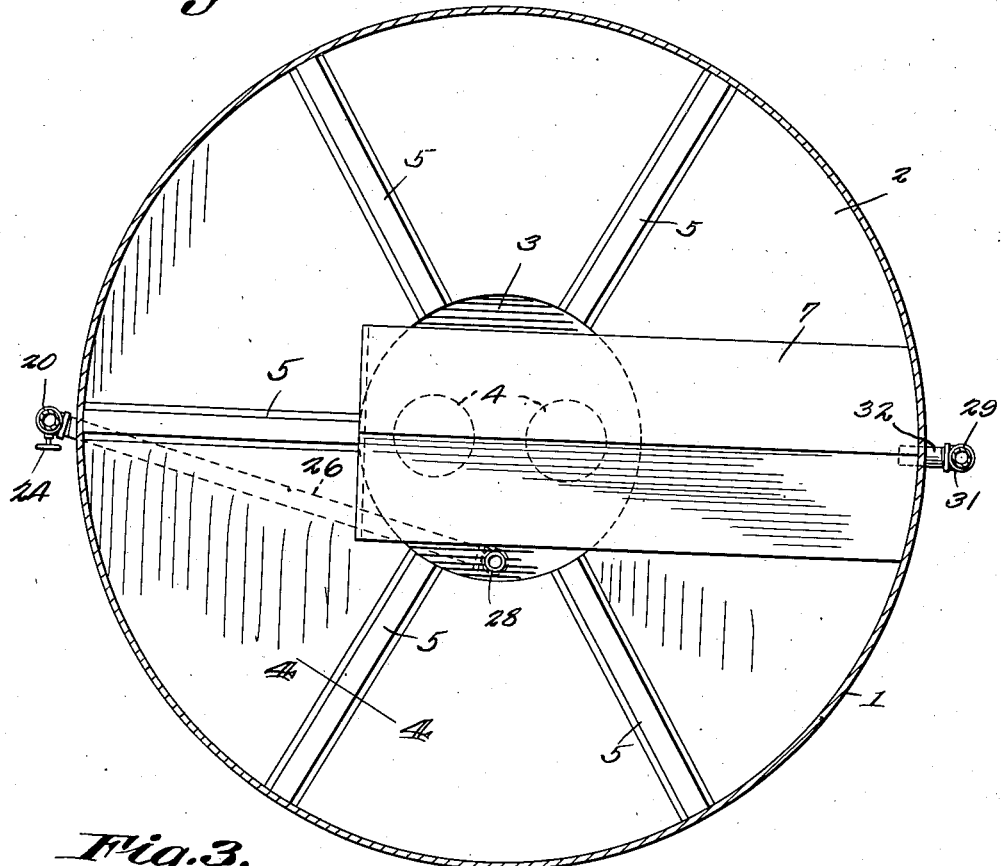
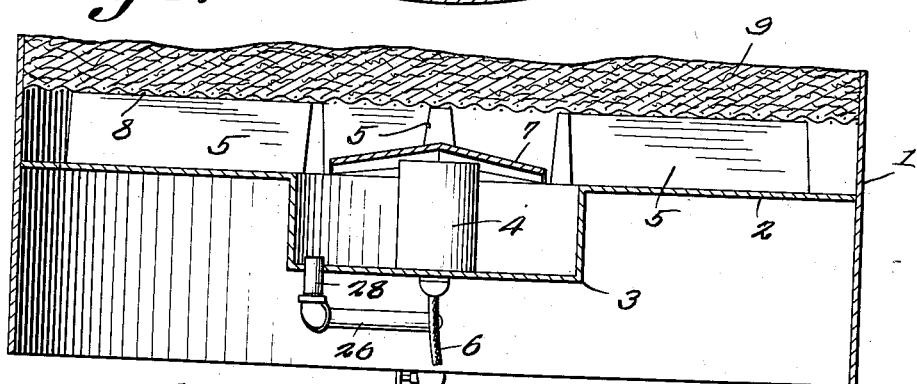
J. F. Guggolz
INVENTOR.
BY C. A. Snow & Co.

Patented Apr. 21, 1942

2,280,577

UNITED STATES PATENT OFFICE 2,280,577

OIL FILTER

John F. Guggolz, Cameron, Tex.

Application April 4, 1941, Serial No. 386,946

5 Claims. (Cl. 210—122.5)

This invention aims to provide novel means for filtering oil, novel means being provided for heating the oil and disposing of the resulting gas, novel means being provided for conducting the oil with respect to the filter, and novel means being supplied for washing the filtering members.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a transverse section on the line 2—2 of Fig. 1;

Fig. 3 is a vertical section on the line 3—3 of Fig. 1.

Fig. 4 is a vertical section on line 4—4 of Fig. 2.

Figure 1:
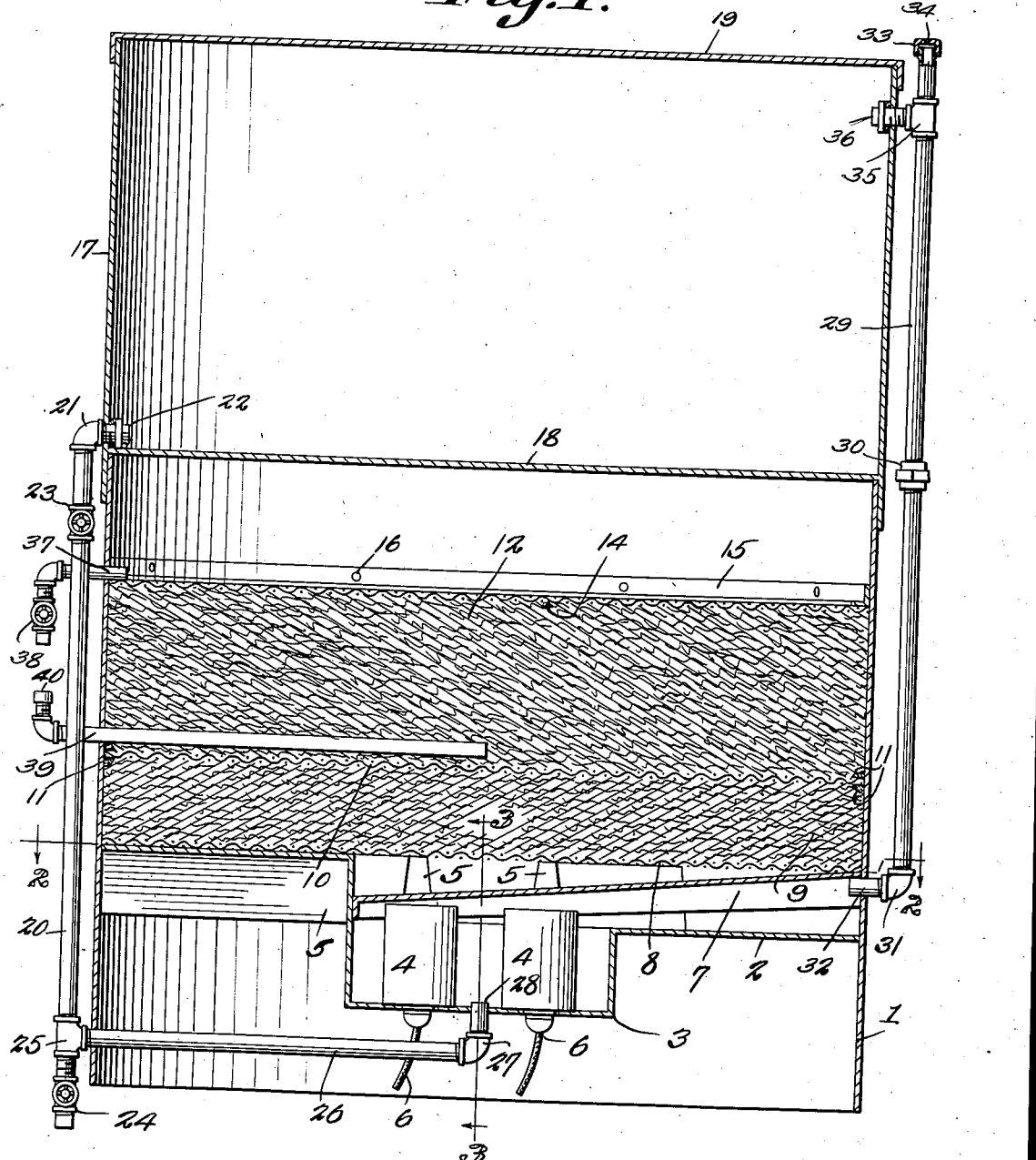
Fig. 1 shows in vertical transverse section, a device constructed in accordance with the invention.

Saving for the filtering members, hereinafter described, the device forming the subject matter of this application may be made of metal throughout. It comprises a lower tank 1, of tubular form, which contains the filtering members and is adapted for the reception of the filtered oil. The lower tank 1 has a bottom 2, spaced vertically from the lower end of the tank, so that the tank may rest conveniently on a support (not shown). The bottom 1 is provided centrally with a depending well 3. Electric heaters 4 are disposed within the well 3 and are attached to the bottom of it. The leads for the heaters 4 are shown at 6 and may extend to any convenient place. The bottom 2 of the lower tank 1 is provided with radial, upstanding, hollow ribs 5, extended inwardly from the shell of the tank to the margin of the well 3. An inverted, V-shaped gas collector 7 is located above the heaters 4, the inner end of the collector being attached to the inner end wall of one of the ribs 5, the outer end of the collector being secured to the shell of the tank 1. The collector 7 extends laterally well beyond the heaters 4 and has an upward slant from its inner end to its outer end, to conduct gas outwardly with respect to the vertical central axis of the tank 1.

A wire netting screen 8 is supported on the upper surfaces of the ribs 5, and is co-extensive in area with the cross section of the tank 1. A mass of lower filtering material 9 rests on the screen 8 and may be composed of cotton, or any other suitable material. On the lower filter member 9 is placed an intermediate screen 10, made of wire netting. The intermediate screen 10 is secured at its periphery to the wall of the tank 1 by means of cement 11, or otherwise. On the intermediate screen 10 is placed an upper mass of filtering material 12, made of the same material as the lower mass of filtering material 9, or of any other suitable material. An upper screen 14, fashioned from wire netting, rests on the upper filter member 12 and is held down on the upper filter member, since the periphery of the screen 14 is engaged by the horizontal flange of a ring 15 which, in cross section, may be an angle member. The vertical flange of the ring 15 is held to the side wall of the tank 1, detachably but firmly, by securing elements 16.

An upper tank 17 is provided and has a bottom 18, spaced from the lower end of the tank 17. The upper end of the lower tank 1 is received within the lower end of the upper tank 17, and the bottom 18 of the upper tank rests on the shell of the lower tank, the upper tank being supported in the position depicted in Fig. 1. A removable lid 19 is carried by the upper end of the upper tank 17.

The numeral 20 marks a vertical conduit for the material to be filtered, for example, dirty oil. The conduit 20 is disposed externally of the tanks 1 and 17. The conduit 20 is provided at its upper end with a coupling 21, in the form of an elbow. Into the elbow 21 is threaded a horizontal intake member 22, entering the side wall of the upper tank 17 in close relation to the bottom 18 of that tank. It will be noted that the intake member 22 serves to hold the upper tank 17, against removal from the lower tank 1, but by threading the intake member 22 out of the coupling 21, the upper tank 17 may be lifted off the lower tank 1. A valve 23, under the control of an operator, is interposed in the conduit or pipe 20, and is located near the upper end of it.

The numeral 24 marks a valve, under the control of an operator, and interposed in the conduit 20, adjacent to the lower end of the lower tank 1. A coupling 25 is interposed in the conduit member 20, near the lower end of the lower tank 1, and into the coupling 25 is detachably threaded a horizontal branch 26 for the conduit 20, the branch entering the lower tank 1, below the bottom 2 thereof. At its inner end, the branch 26 is threaded into an elbow coupling 27, carrying a vertical outlet tube 28, entering the well 3.

A vertical gas conduit 29 is provided, and is disposed externally of the tanks 1 and 17. A coupling 30 is interposed in the conduit pipe 29, intermediate the ends thereof. At its lower end, the conduit 29 is threaded into an elbow 31. A horizontal intake tube 32 is threaded into the coupling or elbow 31, and enters the shell of the tank 1, beneath the outer end of the gas collector 7, the intake tube 32 terminating in close relation to the shell of the tank 1.

At its upper end, the gas conduit 29 carries a threaded cap 33, provided with a small vent hole 34. A coupling 35 is interposed in the conduit 29. The coupling 35 is in the form of a T, a horizontal outlet member 36 being threaded removably into the coupling. The outlet 36 passes through the shell of the tank 1, but may be threaded out of the coupling 35, to permit the tank 17 to be lifted off the tank 1.

Assuming that corrupted oil is to be filtered, the oil is placed in the upper tank 17. The valve 23 is opened, and the oil flows by gravity through the conduit 20, the branch 26 and the outlet tube 28, into the well 3. The oil rises in the well, and rises above the bottom 2 of the tank 1, the oil passing upwardly through the filters 9 and 12, to find storage in the upper end of the lower tank 1, below the bottom 18 of the upper tank 17, there being an appreciable space between the upper screen 14 and the bottom 18 of the upper tank 17. The clean oil may be drawn off by way of an outlet pipe 37, entering the side wall of the lower tank 1, immediately above the screen 14, the flow through the pipe 37 being regulated by a valve 38 in the pipe, and under the control of an operator.

By means of the heaters 4, the temperature of the oil is raised, in the lower part of the tank 1, and above the bottom 2, as well as in the depression 3 of the tank bottom 2, in order that the oil may the more readily pass through the filters 9 and 12.

The gas created by the heating of the oil is caught by the collector 7 and enters the conduit 29 by way of the intake tube 33. The gas passes upwardly, and out of the vent opening 34 in the cap 33. It may happen that oil will be carried upwardly in the conduit member 29, as the gas flows upwardly. The oil that rises in the conduit 29 enters the outlet branch 36 of the conduit member, and is returned to the upper tank 17.

A horizontal, flushing inlet tube 39 enters the side wall of the lower tank 1 and has an open end disposed near the vertical axis of the said tank, within the filtering material 12 and above the intermediate screen 10. At its outer end, the flushing tube 39 has an upturned end, closed by a removable cap 40.

The cap 40 may be removed, and cleaning liquid may be fed into the filtering material 12—9, by way of the tube 39. The filtering material will be thoroughly washed, and the cleaning liquid, laden with impurities, will find an exit by way of the well 3, the outlet tube 28, the branch 26 and the lower end of the conduit 20, the valve 24 being opened.

The device forming the subject matter of this application is simple in construction, but it will be found thoroughly effective for the cleansing of polluted oil and the like, for instance, the oil from the crank cases of motor cars.

What is claimed is:

1. A filter for liquids, comprising upper and lower tanks, each having a bottom, the bottom of the lower tank being provided with a depending well, a heater in the well, a gas collector extended over the heater and outwardly to the side wall of the lower tank, means for conducting gas from the outer end of the collector, filtering material in the lower tank, means for spacing the filtering material from the bottom of the lower tank, there being a space for filtered liquid between the upper surface of the filtering material and the bottom of the upper tank, an outlet for the last-specified space and carried by the lower tank, and a supply conduit leading from the upper tank to the well.

2. A filter for liquids, constructed as set forth in claim 1, and wherein the collector is of inverted V-shape, the collector extending across the upper end of the well.

3. A filter for liquids, constructed as set forth in claim 1, and wherein the means for conducting gas is a conduit having an upper outlet discharging without the upper tank and a lower outlet discharging within the upper tank.

4. A filter for liquids, constructed as set forth in claim 1, and wherein the means for spacing the filtering material from the bottom of the lower tank comprises upstanding radial ribs on the bottom of the lower tank and terminated at their inner ends at the well.

5. A filter for liquids constructed as set forth in claim 1, in combination with a flushing conduit discharging into the filtering material, a valve in the supply conduit and cutting off the supply flow at the will of an operator, the supply conduit having a flushing outlet located between the first valve and the well, and means for opening and closing the flushing outlet at the will of an operator.

JOHN F. GUGGOLZ.